United States Patent [19]

Mellor et al.

[11] Patent Number: 5,093,811
[45] Date of Patent: Mar. 3, 1992

[54] FRACTURE INVESTIGATION BY RESONANCE SWEEPING TECHNIQUE

[75] Inventors: David W. Mellor, Camberley; John W. A. Millar, Twickenham, both of England

[73] Assignee: The British Petroleum Company p.l.c., London, England

[21] Appl. No.: 742,206

[22] Filed: Aug. 5, 1991

Related U.S. Application Data

[63] Continuation of Ser. No. 502,386, Mar. 30, 1990, abandoned.

[30] Foreign Application Priority Data

Apr. 4, 1989 [GB] United Kingdom ............... 8907522

[51] Int. Cl.$^5$ ............................................. G01V 1/40
[52] U.S. Cl. ........................................ 367/35; 181/105; 73/151; 367/86
[58] Field of Search ............... 181/102, 104, 105, 106; 73/151; 367/30, 35, 86

[56] References Cited

U.S. PATENT DOCUMENTS

| | | | |
|---|---|---|---|
| 2,281,751 | 5/1942 | Cloud | 181/106 |
| 4,432,078 | 2/1984 | Silverman | 367/37 |
| 4,671,379 | 6/1987 | Kennedy et al. | 181/106 |
| 4,783,769 | 11/1988 | Holzhausen | 367/35 |
| 4,802,144 | 1/1989 | Holzhausen et al. | 367/35 |
| 4,858,130 | 8/1989 | Widrow | 73/151 |
| 4,869,338 | 9/1989 | Wiggins et al. | 181/106 |
| 4,907,204 | 3/1990 | Medlin | 367/35 |

OTHER PUBLICATIONS

Anderson et al., "A Study of Induced Fracturing Using an Instrumental Approach," SPE of AIME, SPE 153, Oct. 25, 1966.

Berest, P., "Vibratory Phenomena in Oil Drill Holes Application to the Calculation of the Volume of Underground Cavities," Revue Francais de Geotechnique, 1985 No. 32.

Primary Examiner—Ian J. Lobo
Attorney, Agent, or Firm—David J. Untener; Larry W. Evans

[57] ABSTRACT

A method for determining the height and length of a fracture (2) in a borehole (1) involves generating pressure waves at closely spaced frequencies by means of a transmitter (3) at the wellhead. The response at the wellhead of the wellbore-fracture system to the resultant standing waves is measured by means of a transducer (6). A theoretical model of the wellbore-fracture system is generated and compared with the measured response to determine the height and length of the fracture.

9 Claims, 5 Drawing Sheets

FRACTURE INVESTIGATION BY RESONANCE SWEEPING TECHNIQUE

This is a continuation of application Ser. No. 07/502,386 field on Mar. 30, 1990 now abondoned.

This invention relates to a method for determining the extent of fracturing in a mineral formation such as a petroleum reservoir by measuring hydraulic impedance.

A petroleum reservoir is formed by a suitably shaped porous stratum of rock sealed with an impervious rock. The nature of the reservoir rock is extremely important as the oil is present in the small spaces or pores which separate the individual rock grains.

Crude oil is generally found in a reservoir in association with water, which is often saline, and gas. Dependent upon the characteristics of the crude, the temperature and the pressure, the gas may exist in solution in the oil or as a separate phase in the form of a gas cap. The oil and gas occupy the upper part of the reservoir and below there may ba a considerable volume of water, known as the aquifer, which extends throughout the lower levels of the rock.

For oil to move through the pores of the reservoir rock and into a well, the pressure under which the oil exists in the reservoir must be greater than the pressure at the well.

The water contained in the aquifer is under pressure and is one source of drive. The dissolved gas associated with the oil is another and so is the free gas in the gas cap when this is present.

A time will come in the life of an oilfield when the natural pressure of the reservoir declines to such an extent that it is no longer sufficient to force the oil out of the pores of the rock into the well. This stage is often reached before the greater part of the oil is recovered from the reservoir.

Formerly it was the practice to rely on natural drive for as long as possible, only resorting to artificial production methods when the natural pressure dropped too low to sustain a reasonable flow. However, it has now been established that the eventual recovery of oil from a reservoir can be much greater if the pressure is not allowed to drop significantly in the early stages of production. Similarly, by utilizing artificial means of maintaining pressure early in the life of a reservoir, production offtake rates may often be adjusted to economic advantage.

Thus in order to maintain pressure, or to accelerate the natural drive, or to initiate a drive where none occurs naturally, it is frequently necessary to employ the technique known as secondary recovery. The simplest method of forcing the oil out of the reservoir rock is by direct displacement with another fluid. When water is used, the secondary recovery process is called water flooding. The water is injected under considerable pressures.

The formation may contain natural fractures and further fracturing may be induced by the action of water injection, depending on the susceptibility of the formation to fracture.

In order to optimize the effect of water flooding, it is clearly desirable to know the extent of fracturing (existing and potential) in the formation to enable the probable direction of flow of the injected water to be predicted.

Hydraulic Impedance Testing (HIT) is a method which by inducing oscillations in a fluid in a wellbore and by measuring the resulting pressure oscillations the theoretical shape of a fracture can be calculated.

Berest, Revue Francais de Geotechnique, 1985 No 32, pg 5-17 noted that information on fracture volume ought to be able to be deduced from a fracture in a formation by applying forced oscillations.

U.S. Pat. No. 4783769 describes a different approach to determining fracture dimensions using HIT whereby a resonance in the fluid in the wellbore is set up in order to excite the fracture at its lowest resonant frequency and then compute fracture length using the wavespeed in the fracture.

We have now devised a method for determining the height and length of a fracture in a wellbore by analysing the response at the well head of standing waves set up in the wellbore-fracture system.

Thus according to the present invention there is provided a method for determining the height and length of a fracture in a formation in contact with a borehole comprising the steps of (a) generating pressure waves at closely spaced discrete frequencies in the fluid in the wellbore, said pressure waves propagating to the base of the wellbore-fracture system and to the tip of the fracture, (b) obtaining an indication at the wellhead of the resultant standing wave patterns produced in the wellbore-fracture system by said pressure waves, (c) generating a theoretical model of the wellbore-fracture system, and d) adjusting the parameters of height and length of the fracture in said model to obtain a match with said indication to determine the height and length of the fracture.

By closely spaced we mean frequencies at intervals that are small by comparison with the frequency separation of the resonances in the wellbore. These resonances occur at a separation given by $$\frac{a}{2l}$$

for a wellbore length 1 and sonic velocity a.

This technique will be referred to as FIRST (Fracture Investigation by Resonance Sweeping Technique).

The pressure waves at the wellhead may be produced by using a transmitter mounted on the wellhead. The transmitter may bs an electronic device which converts an oscillatory electrical signal into pressure oscillations, or it may be an electromechanical or hydraulic device, or other means may be used.

A preferred transmitter is the electromechanical low frequency pressure oscillator described in Australian Patent No AU-10368/88. This oscillator allows frequencies from approximately 10 to 200 Hz to be generated.

The response signal may be measured by means of a transducer mounted on the wellhead in contact with the fluid in the wellbore. Other appropriate methods for measuring the response signal may also be suitable for the method of the present invention.

The transmitter and transducer are conveniently positioned on the wellhead close to one another, but may be positioned apart or at other locations.

The method of the present invention is suitable for use in wellbores which contain both tubing and packers but preferably in wellbores where neither are present.

The frequency applied to the fluid by the transmitter may suitably be in the range 5-100 Hz, preferably in the range 10-70 Hz.

The frequency may be applied suitably in discrete steps of a frequency in the range 0.0005-0.5 Hz, preferably in the range 0.01 to 0.1 Hz.

The response signal is described by its amplitude over a range of frequencies.

The ratio of the pressure response waveform to the input waveform supplied to the pressure transmitter is termed the transfer function. By plotting this amplitude transfer function against frequency the resonances and modulations produced in the wellbore-fracture system may be studied.

From this analysis the details of hydraulic fractures can be obtained.

As the frequency of the input is varied in discrete steps a series of resonances are seen corresponding to resonant standing wave patterns established in the wellbore and the fracture sheet.

When the fracture is closed, closely spaced peaks are observed due to the standing wave set up in the wellbore. Once the fracture has been opened up a modulation is observed over the top of these peaks representing the standing wave in the fracture coupled with that in the wellbore. This represents the variation in the response between the oscillations being in and out of phase with each other.

The height of the fracture effects the depth of the modulation. The length of the fracture effects the spacing of the modulations.

Hence the amplitude of the modulation gives information about the fracture height and the frequency at which the modulation occurs provides a measurement of the fracture length.

The acoustic impedance of the wellbore is determined by the fluid properties of the fluid in it, together with the dimensions of the wellbore and in the context of the present invention is equivalent to the hydraulic impedance. For example making a number of assumptions, such as Poiseille (or laminar) flow down the wellbore a simple mathematical model gives the impedance of the wellbore $Z_w$ of radius r to be $$Z_w = \frac{a}{\pi r^2 g}$$

where a is the sonic velocity in the fluid and g the acceleration due to gravity.

Similarly by treating the fracture as two elliptical half-wings in the plane of the wellbore with half-height $h_f$ and half length $l_f$ the half height is given by $$h_f^2 = \frac{\sqrt{3} \, \mu_s a_s}{\sqrt{(8\rho P_e)} \, g(1 - \gamma) Z_f}$$

where
- $\mu_s$ is the shear modulus of the rock formation,
- $a_s$ is the fracture shape factor,
- $\gamma$ Poisson's ratio for the formation,
- $\rho$ the fluid density
- $P_e$ the excess pressure of the fluid in the fracture over that in the formation, and
- $Z_f$ is the fracture acoustic impedance.

The fracture shape factor is based on the estimated height and length of the fracture.

This equation assumes that the fluid storage in the fracture is uniformly distributed along the fracture wings, and that the pressure waves in the fluid do not couple to elastic waves in the fracture walls.

The expression for the half length of the fracture can similarly be deduced as $$l_f = \frac{(3 P_e) \tau}{(2 \rho)}$$

where $\tau$ = time taken for the pulse to propagate down the fracture.

The acoustics of the completion and the fracture system can be accurately simulated by using an electrical analogue system. The well completion and fracture are represented by sections analogous to electrical transmission lines with different electrical impedances linked together, with high resistances representing terminations of a wellbore or fracture where a zero fluid-flow condition will hold.

SECT is a computer software package derived from a computer modelling package called SPICE (Simulation Package with Integrated Circuit Emphasis) available from the University of California at Berkeley. The acoustics of the completion and fracture system can be accurately simulated by using an electrical analogue system. The well completion and fracture are represented by sections analogous to electrical transmission lines with different electrical impedances linked together.

SECT may be used in FIRST to model the continuous wave response of the wellbore-fracture system to the standing waves set up. SECT has a special mode for generating amplitude response for a given frequency range of driving signal.

By inputting parameters obtained from field data SECT is able to calculate the response of a number of linked electrical transmission lines and by analogy to produce the expected response of the well bore-fracture system.

The parameters required to characterise the well bore in the electrical analogue are determined from the completion diagram for the well bore.

The sonic velocity in the fluid, shear modulus of the rock formation, Poisson's ratio for the formation and the excess pressure are all determined from field data eg acoustic logging.

The fluid density is a property of the fracturing fluid.

The fracture shape factor is based on both the estimated height and length of the fracture.

Therefore it can be seen that for a given half height and half length of fracture SECT can model the frequency response of the system by using several analogous transmission lines and hence the height and length parameters in SECT can be varied until a good match is obtained with the observed response.

Measurements of phase as well as amplitude can also give information about resonance and modulation. The rapid variation in phase in passing through resonance can provide corroborating data on resonances identified from the amplitude-frequency plot.

Fast Fourier Transforms (FFT) of the resonances and modulations may also be used in interpreting the responses from the wellbore-fracture system.

The invention will now be illustrated with reference to FIG. 1 which is a schematic view of the experimental arrangement.

The wellbore (1) has a perforated region (11) close to the well shoe (12). A vertical two-winged sheet fracture (2) is induced by increasing pressure using the pump (13). The fracture has a half height ($h_f$) and half length ($l_f$). The well head remains closed and pressure oscillations over a range of frequencies are induced at the well head by means of the transmitter (3) receiving a signal, via the power amplifier (4), from the frequency response analyser (5).

The response to this driving pressure wave is measured by means of the transducer (6) which is also linked via amplifier (10) to the frequency response analyser (5).

The frequency response analyser is controlled by the unit (7) which is linked to both a plotter (8) and a digital cassette recorder (9).

The invention will be further illustrated with respect to the following Example and FIGS. 2-7.

Example

This Example was performed on a waterflood fracture generated on the water injector well A2 in the Welton Field.

The completion for the well consisted of 1277 m of 17.78 cm casing followed by 362 m of 11.43 cm casing. The perforations were at intervals of 1523-1526 m, 1527-1535 m and 1562-1586 m.

Pumping was initiated at the well head using a standard pump truck until the well head injection pressure (WHIP) had reached a suitable level for fracturing to occur. The occurrence of a fracture was observed as a sudden increase in the rate of flow of the fracturing fluid. This was observed at a WHIP of 1000 psi.

An electromechanical oscillator supplied by Saipem Australia Property Ltd was positioned at the wellhead. This was connected via a C-Audio type SR707 power amplifier to a Hewlett Packard 1250 frequency response analyser controlled using a Hewlett Packard 9826 control unit.

Standing waves were set up in the wellbore-fracture system by initiating pressure oscillations at the well head by means of the oscillator.

The frequency of the oscillations was varied in discrete steps over a range of 5-120 Hz by means of the frequency response analyser (FRA) while maintaining a constant amplitude.

The response of the wellbore-fracture system to the constant amplitude signal across the frequency range was measure using a PCB 116A02 transducer mounted on the wellhead.

The signal from the transducer was passed to the FRA via a BrUel and Kjaer charge amplifier. The response signal was then suitably recorded using a standard plotter and digital cassette recorder both of which were linked to the FRA via the control unit.

Across the frequency range the transfer function was measured at intervals of 0.05 Hz between 10 and 40 Hz and again between 50 and 70 Hz.

The relative amplitude of the transfer function was measured using the FRA.

The results are shown in the accompanying FIGS. 2-7.

Standing waves in the larger diameter casing give rise to closely spaced peaks about 0.5 Hz apart. The standing waves in the smaller casing modulate this pattern but due to interference from the three sets of perforations and the casing shoe this modulation cannot be seen.

Figure 3:
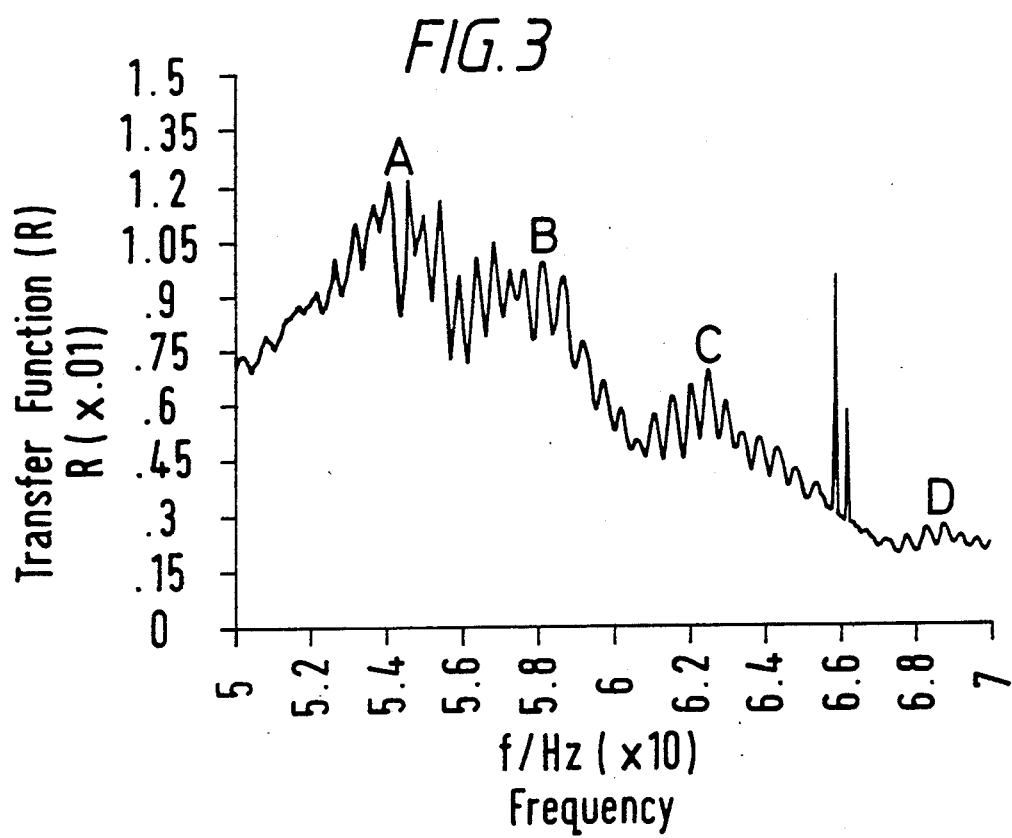
FIG. 3 shows the transfer function over the same range with a WHIP of 1160 psi which was sufficient to cause the fracture to open.

Once the fracture has been opened up the fracture mouth and tip provide a dominant reflection and a modulation of approximately 5.4 Hz due to the standing wave in the fracture is observed at each of A-D in FIG. 3.

Figure 1:
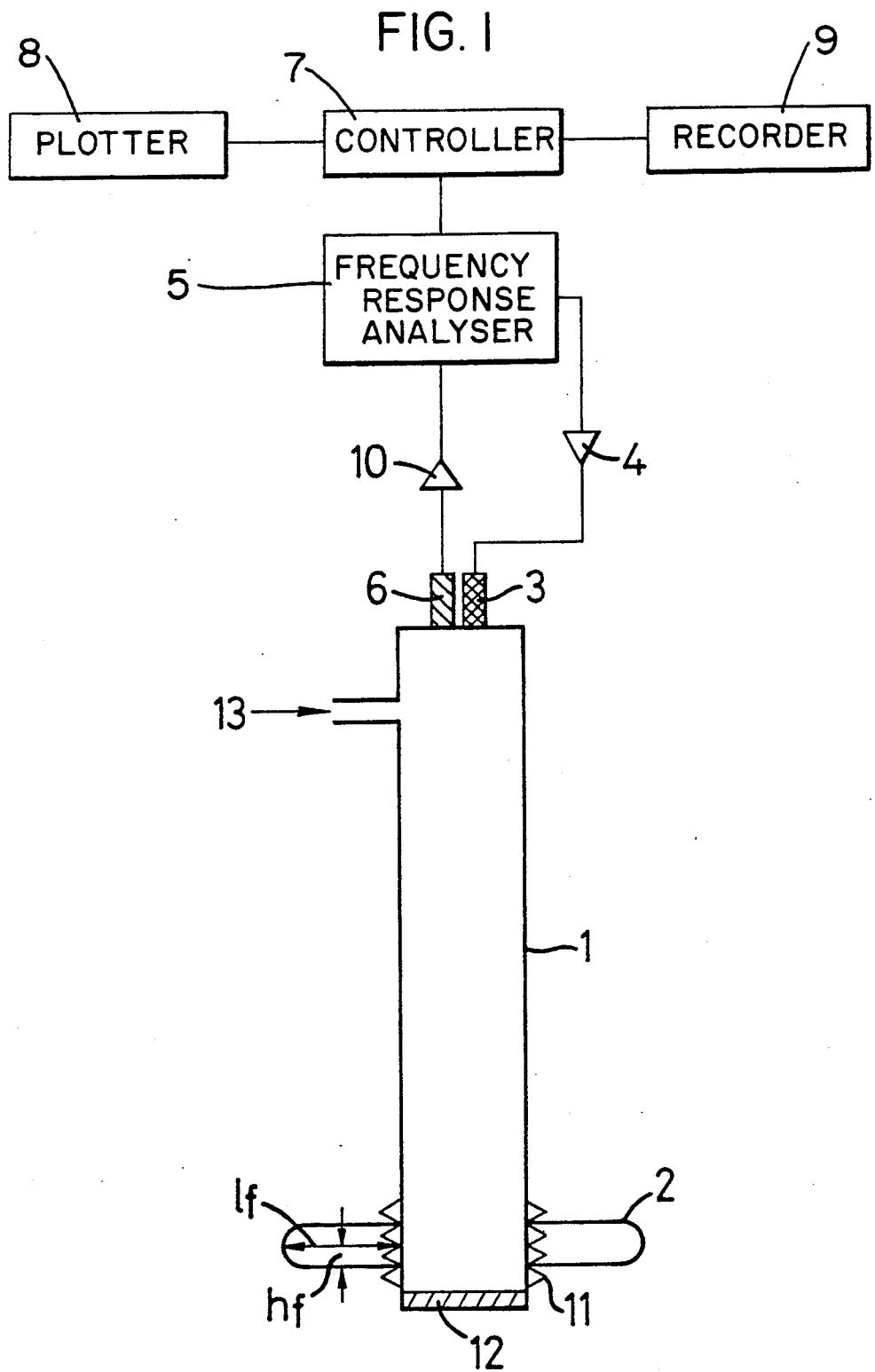
Figure 2:
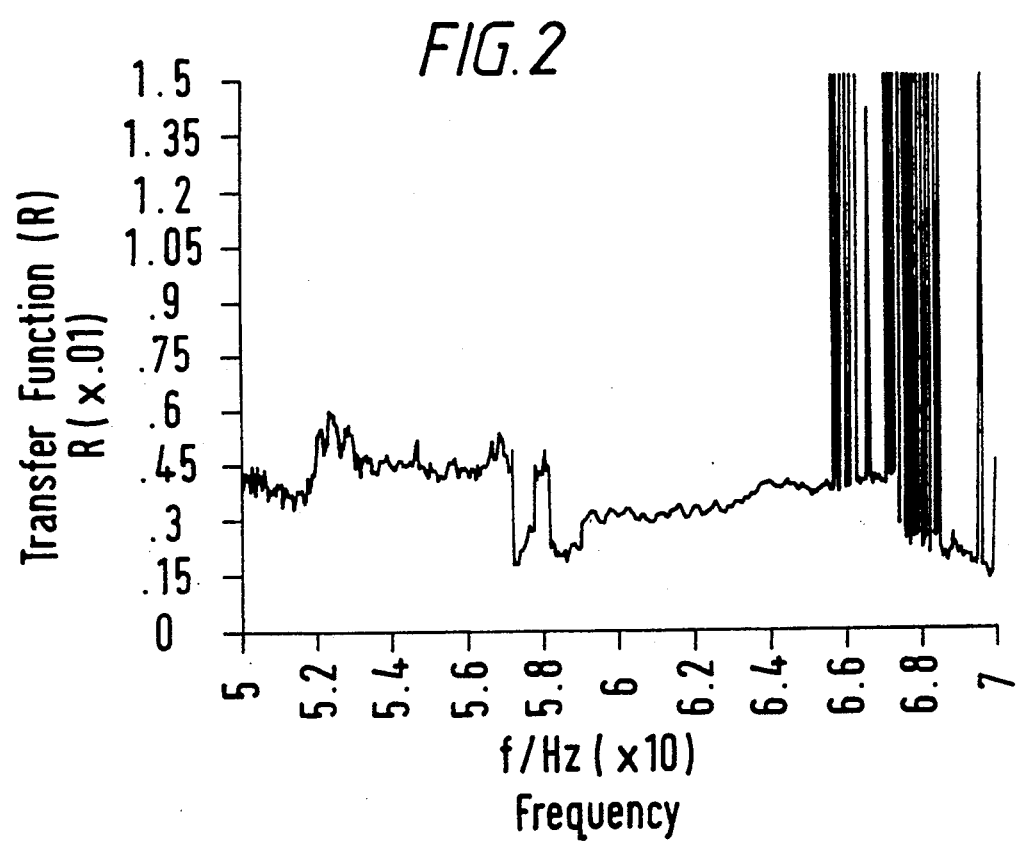
FIG. 2 shows the transfer function over the frequency range 50-70 Hz with a WHIP of 680 psi which was insufficient to initiate a fracture.

From FIGS. 2 and 3 it can be observed that the response of the wellbore-fracture system in the presence of a fracture is distinguishable from that without a fracture.

Figure 4:
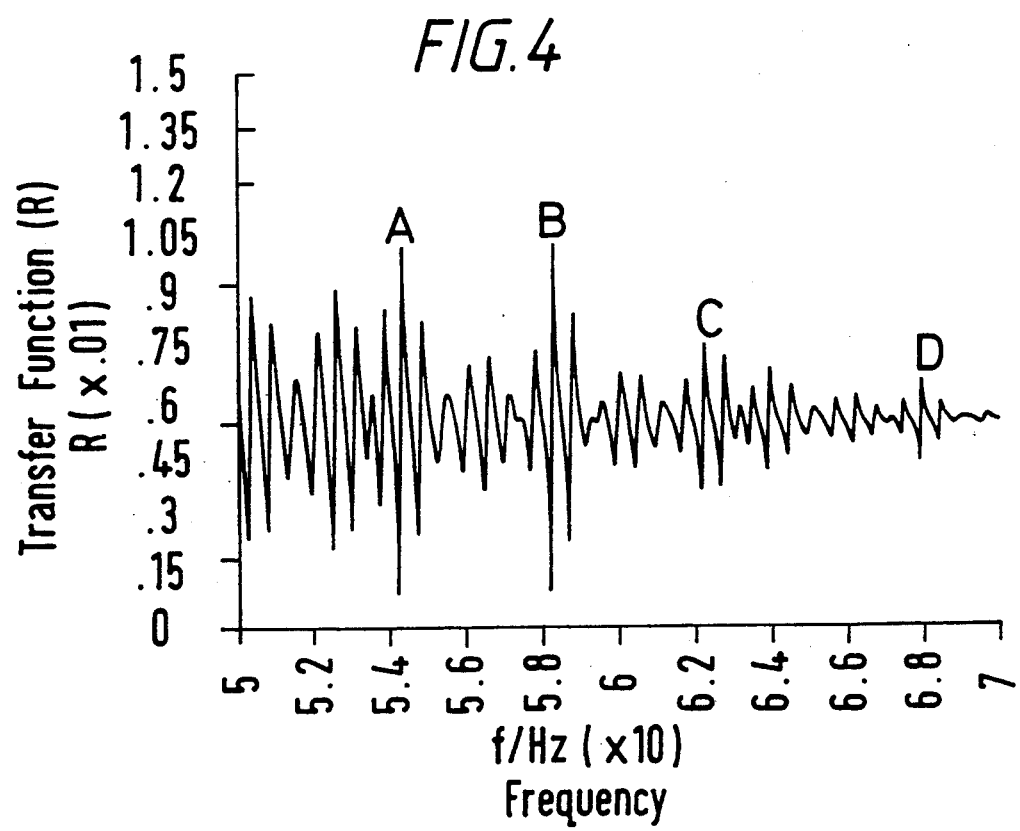

The SECT simulation for the open fracture is shown in FIG. 4 using the modulation length of approximately 5.4 Hz. The deduced fracture dimensions were half height 0.97 m and half length 4.6 m. The corresponding modulations are similarly shown as A-D in FIG. 4.

In the region 66-68 Hz some statistical errors are observed where convergence to a stable value cannot be achieved.

Figure 5:
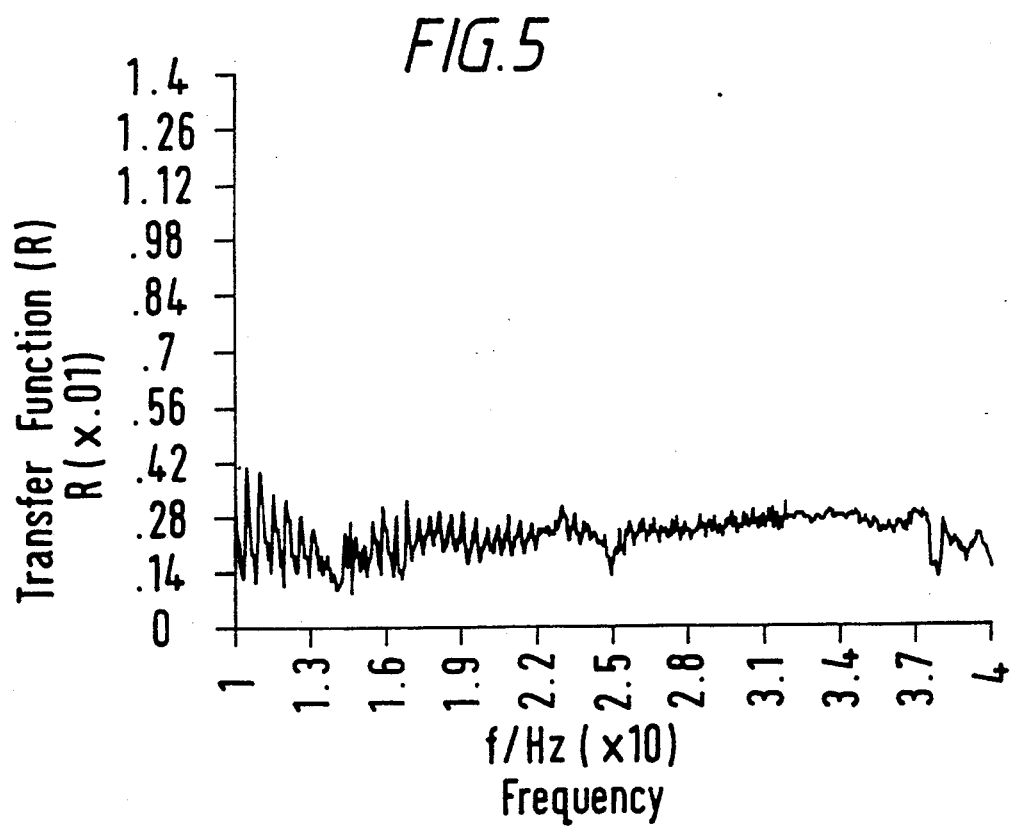

A second set of measurements were made over the lower frequency range of 10-40 Hz. The transfer functions against frequency are shown in FIG. 5 (no fracture, 650 psi) and FIG. 6 (fracture open, 1236 psi).

Figure 6:
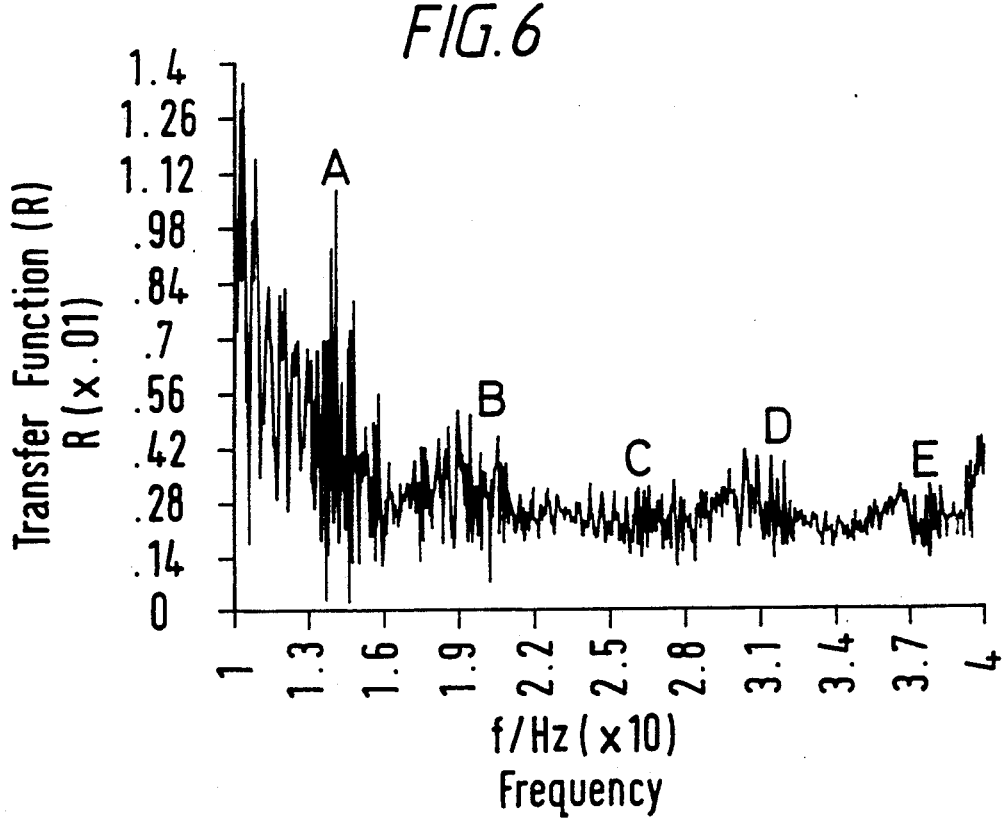

The modulations A-E are again seen in FIG. 6 with the fracture open but not when closed. In FIG. 6 considerable noise is present partially obscuring the slow modulation and again there is attenuation increasing with frequency.

Figure 7:
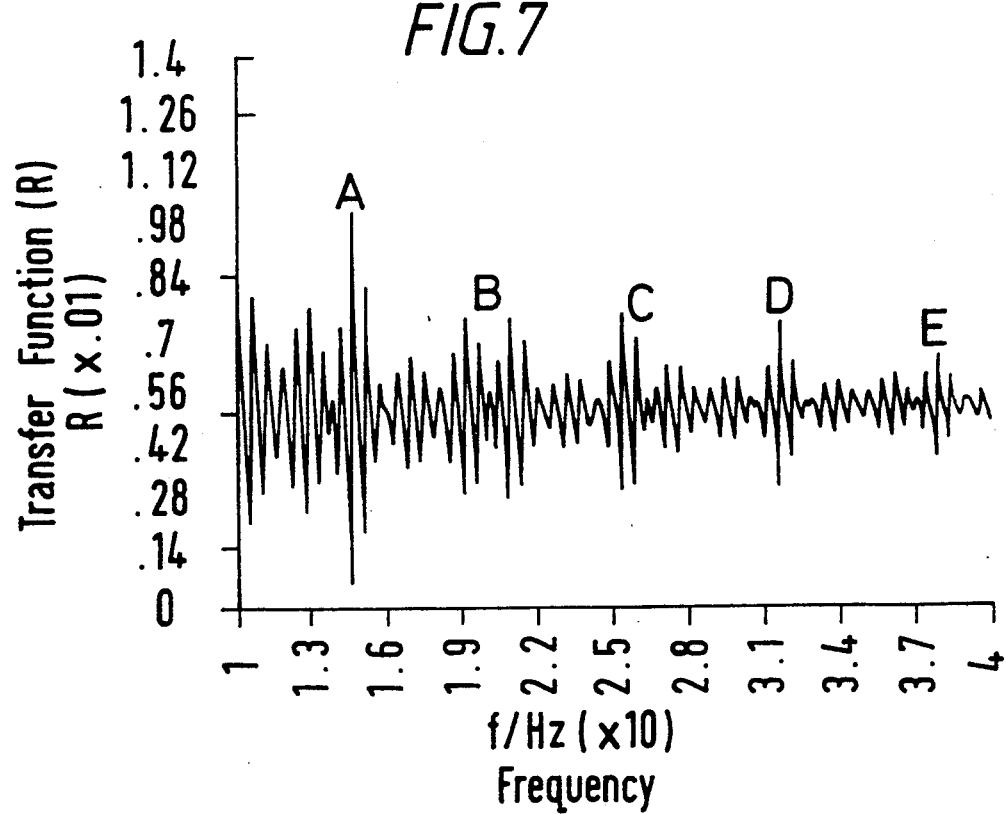

The SECT simulation is shown in FIG. 7 using a modulation length of approximately 4.6 Hz. The deduced fracture dimensions were half height 0.97 m and half length 5.35 m and again the modulations A-E can be clearly seen.

The lower frequency measurements were taken several days after those in the range 50-70 Hz. It is likely the increased half length of the fracture to 5.35 m is due to the repeated opening and closing of the fracture.

We claim:

1. A method for determining the height and length of a fracture in a formation in contact with a wellbore comprising the steps of
    (a) generating pressure waves of closely spaced discrete frequencies in the fluid in the wellbore, said pressure waves propagating to the base of the wellbore fracture system and to the tip of the fracture,
    (b) obtaining an indication at the wellhead of the resultant standing wave patterns produced in the wellbore fracture system by said pressure waves,
    (c) analyzing said indication to determine the height and length of the fracture.

2. A method according to claim 1 wherein the pressure waves are generated in discrete steps at frequencies in the range 0.0005 to 0.5 Hz.

3. A method according to claim 2 wherein the pressure waves are generated indiscrete steps at frequencies in the range 0.01 to 0.1 Hz.

4. A method according to claim 1 wherein the pressure waves are generated by a transmitter mounted on the wellhead.

5. A method according to claim 4 wherein the transmitter is an electromechanical low frequency pressure oscillator.

6. A method according to claim 1 wherein the indication of the resultant standing wave patterns in the wellbore-fracture system are obtained by means of a transducer in contact with the fluid in the wellbore.

7. A method according to claim 1 wherein the indication of the resultant standing wave patterns in the wellbore-fracture system is represented as a function of phase against frequency.

8. A method according to claim 1 wherein the frequency of the generated pressure waves is in the range 5–100 Hz.

9. A method according to claim 8 wherein the frequency of the pressure waves is in the range 10–70 Hz.

* * * * *

UNITED STATES PATENT AND TRADEMARK OFFICE
CERTIFICATE OF CORRECTION

PATENT NO. : 5,093,811
DATED : March 3, 1992
INVENTOR(S) : David W. Mellor et al It is certified that error appears in the above-identified patent and that said Letters Patent is hereby corrected as shown below:

In claim 1, column 6, line 52, after the word waves, add --said indication represented as a function of amplitude against frequency--.

In claim 1, column 6, line 53, (c) delete "analyzing said indication to determine the height and length of the fracture" and add --determining the height of the fracture from the amplitude of the indication and the length of the fracture from the frequency of the indication.--

Signed and Sealed this

Fifteenth Day of June, 1993

Attest:

MICHAEL K. KIRK

Attesting Officer

Acting Commissioner of Patents and Trademarks